United States Patent
Sakai

(10) Patent No.: US 8,248,668 B2
(45) Date of Patent: Aug. 21, 2012

(54) IMAGE PROCESSING DEVICE, IMAGE PROCESSING METHOD, AND IMAGE FORMING APPARATUS

(75) Inventor: Norio Sakai, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 576 days.

(21) Appl. No.: 12/457,239

(22) Filed: Jun. 4, 2009

(65) Prior Publication Data

US 2009/0303549 A1 Dec. 10, 2009

(30) Foreign Application Priority Data

Jun. 5, 2008 (JP) ................................. 2008-148257

(51) Int. Cl.
*H04N 1/00* (2006.01)
*H04N 1/04* (2006.01)
*H04N 9/80* (2006.01)
*G06F 3/12* (2006.01)
*G06K 9/36* (2006.01)

(52) U.S. Cl. .................. 358/426.02; 358/1.15; 358/474; 382/232; 382/239; 386/241

(58) Field of Classification Search ............. 358/426.02, 358/1.15, 474; 382/239, 232; 370/389; 386/241
See application file for complete search history.

(56) References Cited

U.S. PATENT DOCUMENTS

| 7,123,385 | B2 | 10/2006 | Oteki et al. | |
|---|---|---|---|---|
| 2004/0105587 | A1* | 6/2004 | Nomizu | 382/232 |
| 2005/0206968 | A1* | 9/2005 | Sodeura et al. | 358/474 |
| 2009/0231612 | A1* | 9/2009 | Matsushita | 358/1.15 |

FOREIGN PATENT DOCUMENTS

| JP | 11-289427 | 10/1999 |
|---|---|---|
| JP | 2001-218064 | 8/2001 |
| JP | 2006-107056 | 4/2006 |
| JP | 2006-261803 | 9/2006 |

OTHER PUBLICATIONS

Japanese Office Communication dated Mar. 13, 2012 for Japanese Patent Application No. 2008-148257.

* cited by examiner

*Primary Examiner* — Charlotte M Baker
*Assistant Examiner* — Rury Grisham
(74) *Attorney, Agent, or Firm* — Harness, Dickey & Pierce, P.L.C.

(57) ABSTRACT

An image processing device including a first image reading unit to read image data on a front side of a document page, a second image reading unit to read image data on a back side of the document page, a first image processing unit to process the image data read by the first image reading unit, a second image processing unit to process the image data read by the second image reading unit, a memory to store image data, a memory control unit to control access to the memory, and a bus switch that connects the first image processing unit and the second image processing unit to the memory control unit. The bus switch includes a first compression unit to compress the image data processed by the first image processing unit, and a second compression unit to compress the image data processed by the second image processing unit.

9 Claims, 13 Drawing Sheets

IMAGE PROCESSING DEVICE, IMAGE PROCESSING METHOD, AND IMAGE FORMING APPARATUS

PRIORITY STATEMENT

The present patent application claims priority from Japanese Patent Application No. 2008-148257, filed on Jun. 5, 2008 in the Japan Patent Office, the entire contents of which are hereby incorporated herein by reference.

BACKGROUND

1. Technical Field

Illustrative embodiments generally relate to an image processing device capable of simultaneously reading image data on front and back sides of document pages, an image processing method employed in the image processing device, and an image forming apparatus including the image processing device.

2. Description of the Related Art

In related-art image forming apparatuses, a document page may be reversed by an automatic document feeder when image data on both front and back sides of the document page are read using a single reading unit. Alternatively, two reading units, one each for reading the image data on the front and back sides of the document page, respectively, may be provided in the automatic document feeder, so that the image data on the front and back sides of the document page are simultaneously read by the respective reading units without reversing the document page.

In terms of faster processing speed and lower energy consumption, more advantages can be obtained by simultaneously reading the image data on the front and back sides of the document page than by reversing the document page to read the image data on both sides of the document page.

In the image forming apparatuses that simultaneously read image data on the front and back sides of the document page, for example, image data respectively read by first and second reading units are temporarily stored in a memory, and processed by a single image processing unit.

FIG. 1 is a block diagram illustrating a configuration of a related-art image forming apparatus capable of simultaneously reading image data on both front and back sides of document pages. Referring to FIG. 1, the image forming apparatus includes a contact image sensor (CIS) 1100 serving as a first color image reading unit and a charge coupled device (CCD) 1110 serving as a second color image reading unit, so that image data on both front and back sides of a document page can be read simultaneously without reversing the document page. An engine CPU 1120 to control each component in the image forming apparatus is also included in the image forming apparatus.

The image forming apparatus further includes shading correction units 1101 and 1111 that perform shading correction on the image data read by the CIS 1100 and the CCD 1110, respectively. Thereafter, the image data read by the CCD 1110 (hereinafter referred to as-first image data) is processed by an image processing unit 1500 first. While image processing is performed on the first image data by the image processing unit 1500, the image data read by the CIS 1100 (hereinafter referred to as second image data) is temporarily stored in a local memory 1400. Thereafter, when image processing performed on the first image data by the image processing unit 1500 is completed, the second image data is processed by the image processing unit 1500. After completion of image processing, the first and second image data are stored in a memory 1202.

In a case in which the image data read by the CIS 1100 and the CCD 1110 are monochrome image data, image processing is simultaneously performed on both of the image data by additionally using an image processing unit for full-color image data, not shown. However, in a case in which one of the image data read by the CIS 1100 and the CCD 1110 is full-color image data, image processing is sequentially performed on the image data on each of the front and back sides of the document page as illustrated in FIG. 2. Consequently, an image processing parameter is required to be set to the image processing unit 1500 each time the image data on either the front or back side of the document page is processed, increasing processing load on software during a page interval.

Further, because image processing is performed on the back side of the document page during the page interval as illustrated in FIG. 2, faster processing speed is required to reduce the page, interval and thus increase productivity.

SUMMARY

In view of the foregoing, illustrative embodiments described herein provide an image processing device capable of reducing resetting of parameters in an image processing unit and reducing processing load on software, an image processing method employed in the image processing device, and an image forming apparatus including the image processing device.

At least one embodiment provides an image processing device including a first image reading unit to read image data on a front side of a document page, a second image reading unit to read image data on a back side of the document page, a first image processing unit to process the image data read by the first image reading unit, a second image processing unit to process the image data read by the second image reading unit, a memory to store the image data processed by the first image processing unit and the second image processing unit, a memory control unit to control access to the memory, and a bus switch that connects the first image processing unit and the second image processing unit to the memory control unit. The bus switch includes a first compression unit to compress the image data processed by the first image processing unit, and a second compression unit to compress the image data processed by the second image processing unit. The bus switch outputs to the memory control unit encoded data generated by compressing the image data using the first compression unit and the second compression unit.

At least one embodiment provides an image processing method employed in the image processing device described above. The image processing method includes the steps of first reading image data on a front side of a document page, second reading image data on a back side of the document page, first processing the image data read by the first reading, second processing the image data read by the second reading, storing the image data processed in the first processing and the second processing, first compressing the image data processed by the first processing, second compressing the image data processed by the second processing, and outputting encoded data generated by the first compressing and the second compressing to the memory. The first compressing, the second compressing, and the outputting are performed in the bus switch.

At least one embodiment provides an image forming apparatus including the image processing device described above.

Additional features and advantages of the illustrative embodiments will be more fully apparent from the following detailed description, the accompanying drawings, and the associated claims.

BRIEF DESCRIPTION OF THE DRAWINGS

A more complete appreciation of the illustrative embodiments described herein and the many attendant advantages thereof will be readily obtained as the same becomes better understood by reference to the following detailed description when considered in connection with the accompanying drawings, wherein.

Figure 1:
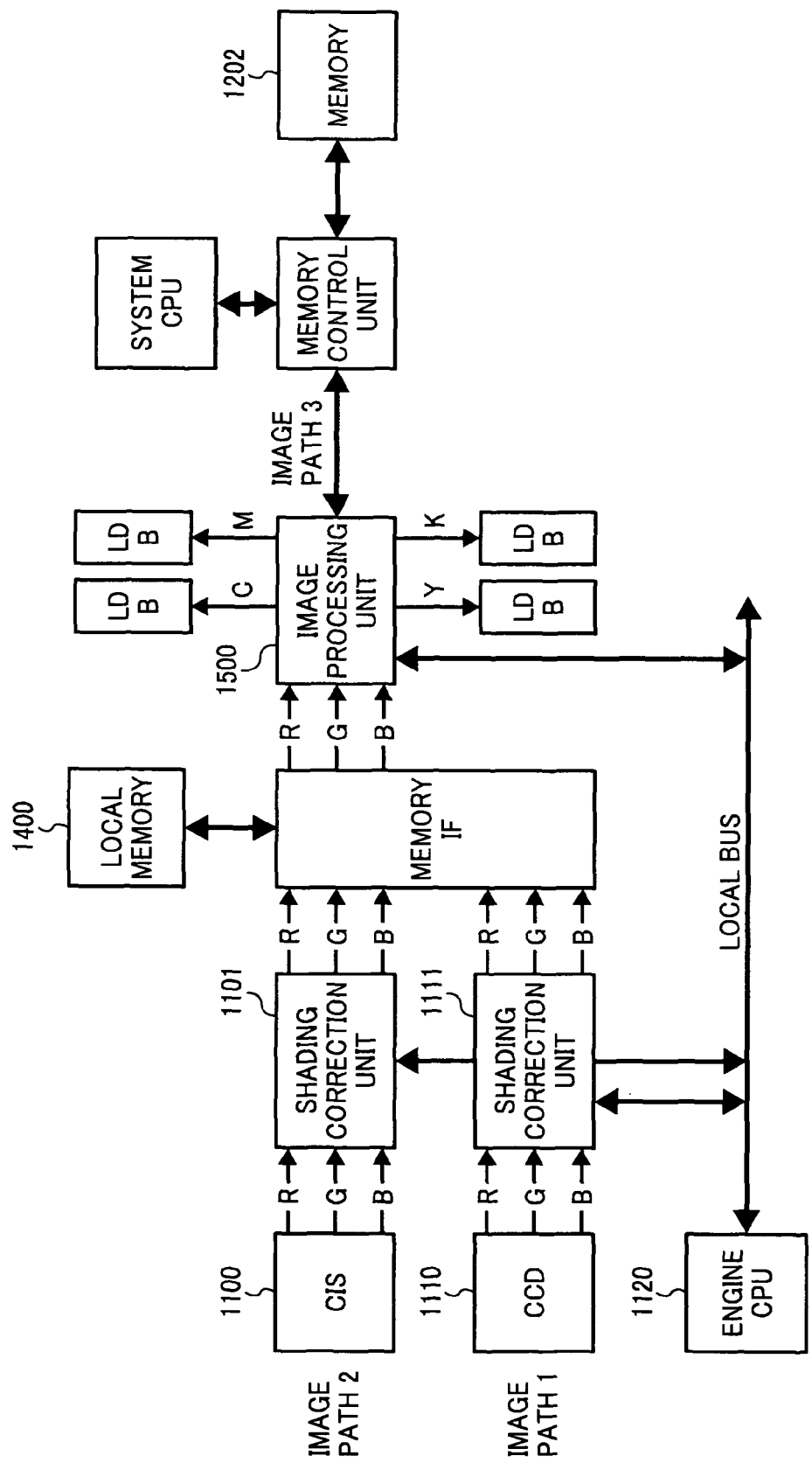
FIG. 1 is a block diagram illustrating a configuration of a related-art image forming apparatus capable of simultaneously reading image data on front and back sides of document pages.
Figure 2:
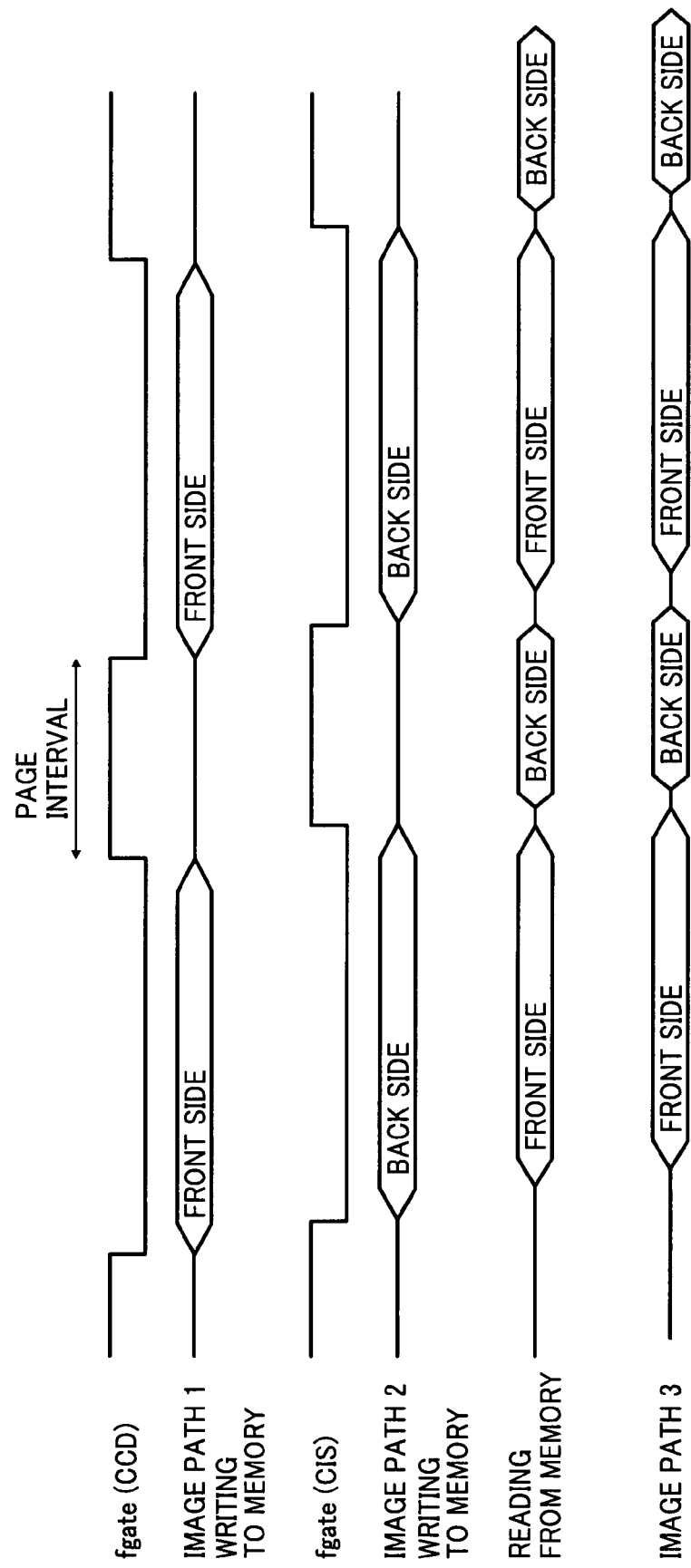
FIG. 2 is a timing chart illustrating image transfer performed in the related-art image forming apparatus.

The accompanying drawings are intended to depict illustrative embodiments and should not be interpreted to limit the scope thereof. The accompanying drawings are not to be considered as drawn to scale unless explicitly noted.

DETAILED DESCRIPTION OF ILLUSTRATIVE EMBODIMENTS

In describing illustrative embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

Reference is now made to the drawings, wherein like reference numerals designate identical or corresponding parts throughout the several views.

Figure 3:
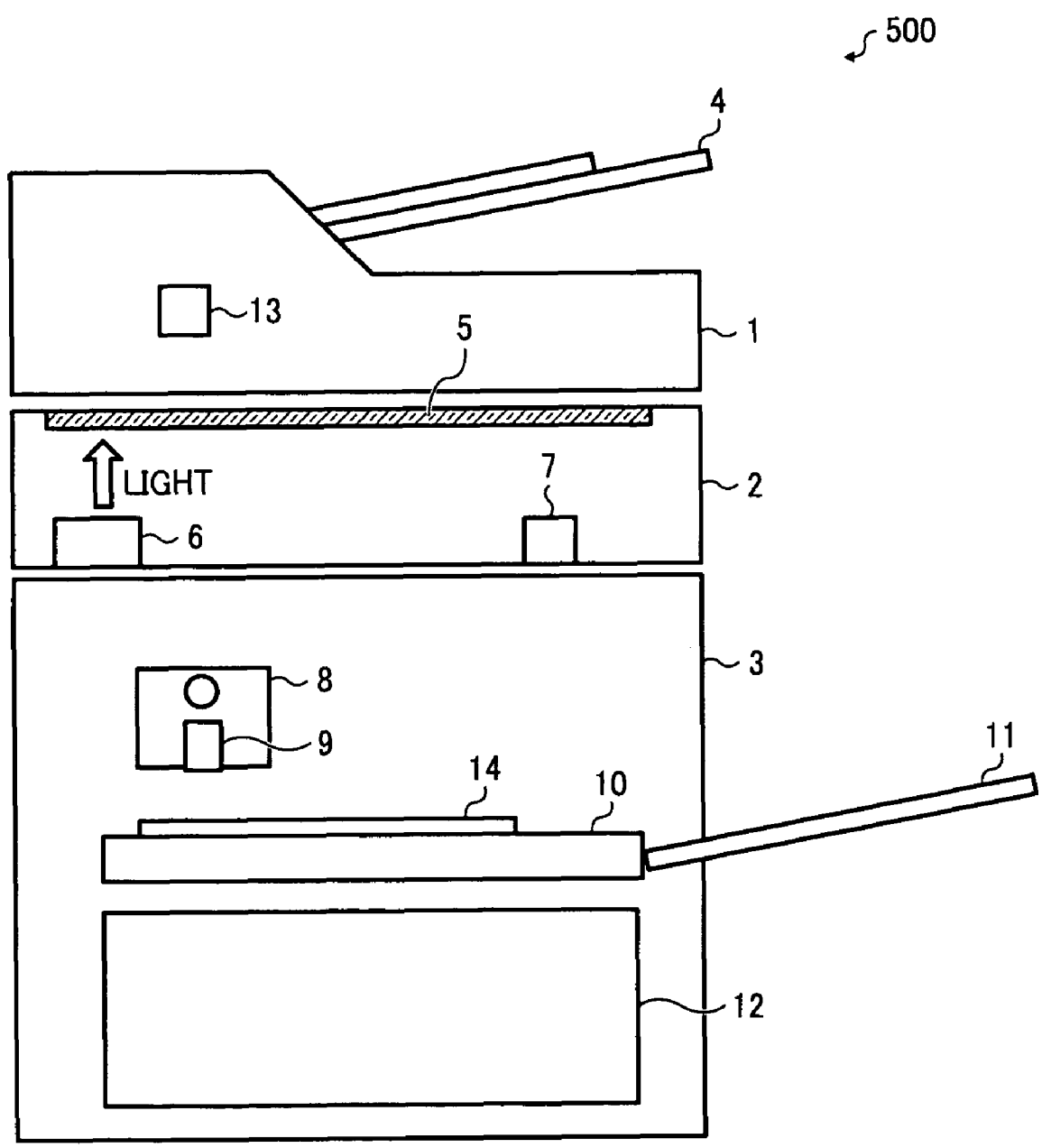
FIG. 3 is a schematic view illustrating a configuration of an image forming apparatus according to illustrative embodiments.

FIG. 3 is a schematic view illustrating a configuration of an image forming apparatus 500 according to illustrative embodiments. The image forming apparatus 500 includes, as main components thereof, an image reading device 2 including an automatic document feeder (ADF) 1, and a main body 3 including a paper feed tray 12.

In order to read image data on a document page, light is directed from a lamp 6 onto the document page set either on a document stand 4 of the ADF 1 or a document reading glass 5 of the image reading device 2, and a signal reflected from the document page is read by a sensor 7 including a charge coupled device (CCD) and a contact image sensor (CIS), not shown.

The signal read by the sensor 7 is converted into a digital signal by a device such as an analog front end (AFE), and is sent to a controller, not shown, provided either in the image reading device 2 or the main body 3. The signal, or image data, thus sent is processed by the controller to be converted into image data for-printing, and is sent to a personal computer (PC), a printer engine, or the like, not shown. When an inkjet printer is used, the printer engine performs rendering to displace the image data in the order the image data is transferred to a head included in a carriage 8.

A print sheet 14 fed from the paper feed tray 12 is conveyed to a sheet conveyance belt 10, and is detected by a sheet edge sensor 9. When the carriage 8 including the head is moved to a position for starting a printing operation, print data on which rendering is performed as described above is transferred to the head to start the printing operation. When the printing operation is completed, the print sheet 14 having a printed image thereon is discharged to a discharge tray 11.

When image data on both front and back sides of the document page are simultaneously read by the image forming apparatus 500 having the above-described configuration, the ADF 1 employing a sheet-through system is used. Specifically, the document page set on the document stand 4 or the document reading glass 5 is irradiated by the light from the lamp 6 stopped on an upstream side relative to a direction of conveyance of the document page. Subsequently, the light reflected from the document page is collected and read by the sensor 7 so that the image data on the front side of the document page is read.

By contrast, image data on the back side of the document page is read by a sensor 13 such as a CIS including an LED serving as a light source, a lens, a sensor element, and so forth. The sensor 13 is provided at a position facing the back side of the document page on a downstream side relative to the direction of conveyance of the document page. Specifically, when the document page passes immediately below the sensor 13, light is directed onto the back side of the document page from a lamp in the sensor 13. The light reflected from the back side of the document page is collected by the lens in the sensor 13 and is directed to the sensor element to be photoelectrically converted into electrical signals, so that the image data on the back side of the document page is read.

A description is now given of a configuration and operations of an image processing device included in the image forming apparatus 500.

Figure 4:
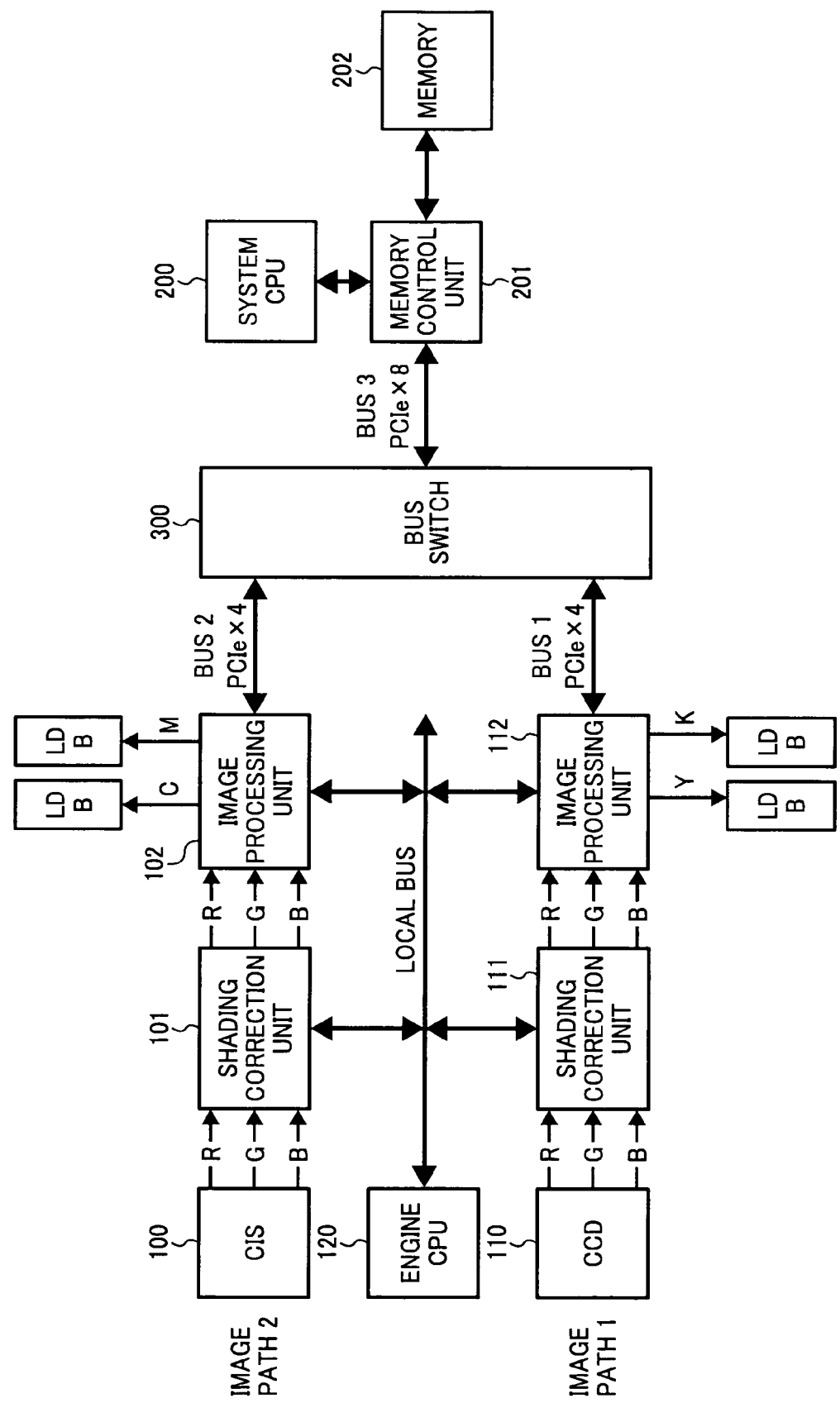
FIG. 4 is a block diagram illustrating a configuration of an image processing device according to a first illustrative embodiment.

FIG. 4 is a block diagram illustrating a configuration of an image processing device according to a first illustrative embodiment. In order to simultaneously read image data on both the front and back sides of the document page, the image forming apparatus 500 includes a CIS 100 serving as a first color image reading unit, and a CCD 110 serving as a second color image reading unit. The image forming apparatus 500 further includes an engine CPU 120 to control each unit of the image forming apparatus 500.

Shading correction units 101 and 111 and image processing units 102 and 112 are provided for the CIS 100 and the CCD 110, respectively, so that the image data simultaneously read by the CIS 100 and the CCD 110 are processed at the same time.

Specifically, the image data on the front side of the document page read by the CCD 110 is sent to the shading correction unit 111 for the CCD 110 through an image path 1, and is normalized by the shading correction unit 111 based on black and white reference levels. Thereafter, filter processing, background removal, color correction, magnification, and compression are performed on the image data by the image processing unit 112, and then the image data is output to a bus switch 300 via a high-speed serial bus 1.

Simultaneously, the image data on the back side of the document page read by the CIS 100 is sent to the shading correction unit 101 for the CIS 100 through an image path 2, and is normalized by the shading correction unit 101 based on black and white reference levels. Thereafter, filter processing, background removal, color correction, magnification, and compression are performed on the image data by the image processing unit 102, and then the image data is output to the bus switch 300 via a high-speed serial bus 2.

The bus switch 300 outputs the image data thus processed to a memory 202 through a memory control unit 201 via a bus 3. The memory control unit 201 is controlled by a system CPU 200, and controls access to the memory 202. The image data thus output are stored in the memory 202.

Figure 5:
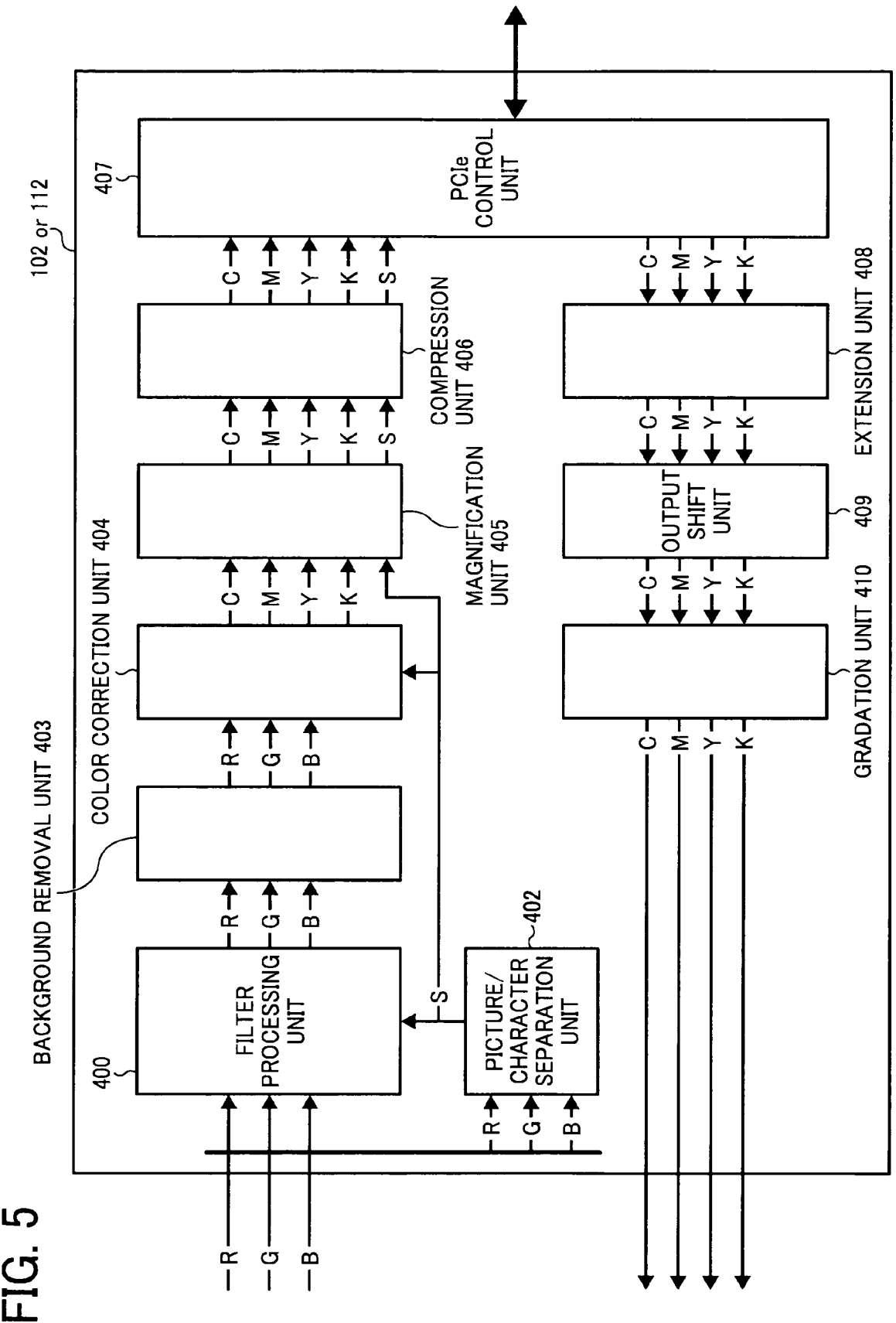
FIG. 5 is a block diagram illustrating a configuration of an image processing unit of the image processing device according to the first illustrative embodiment.

FIG. 5 is a block diagram illustrating a configuration of the image processing unit 102 or 112 according to the first illustrative embodiment. Each of the image processing units 102 and 112 includes a filter processing unit 400; a picture/character separation unit 402, a background removal unit 403, a color correction unit 404, a magnification unit 405, a compression unit 406, an extension unit 408, an output shift unit 409, a gradation unit 410, and a PCIe control unit 407. The image data is output to the bus switch 300 under control of the PCIe control unit 407.

Figure 6:
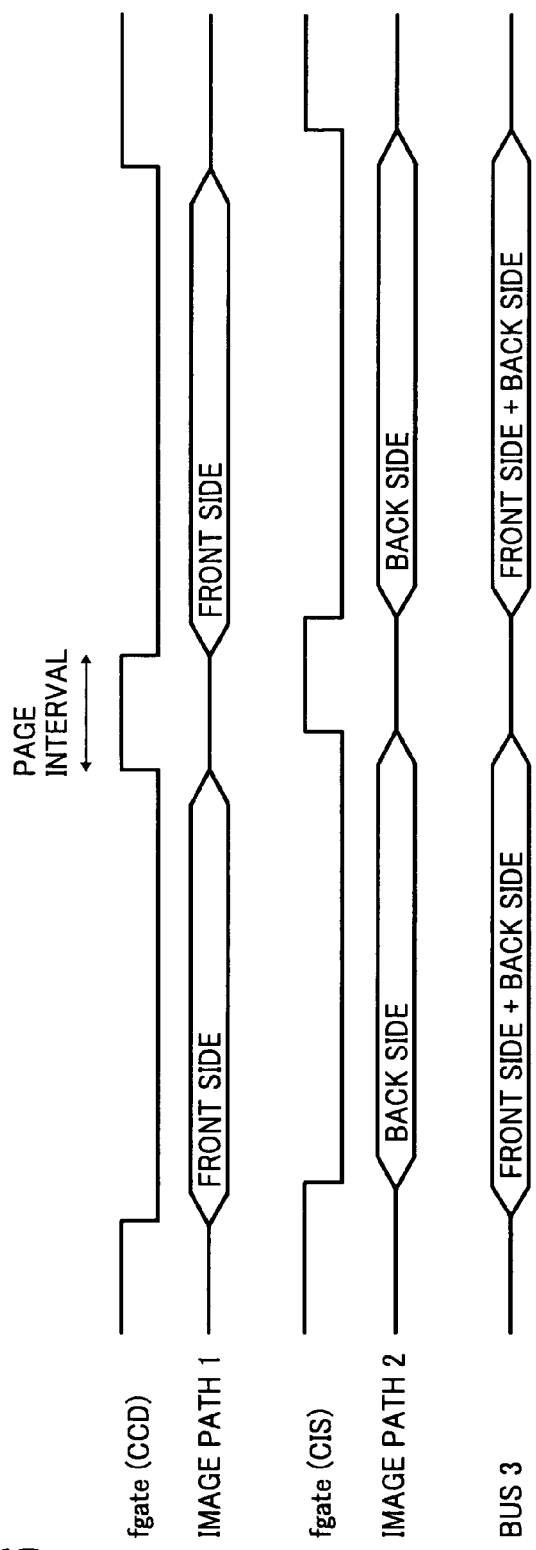
FIG. 6 is a timing chart illustrating data transfer performed in the image processing device according to the first illustrative embodiment.
Figure 7:
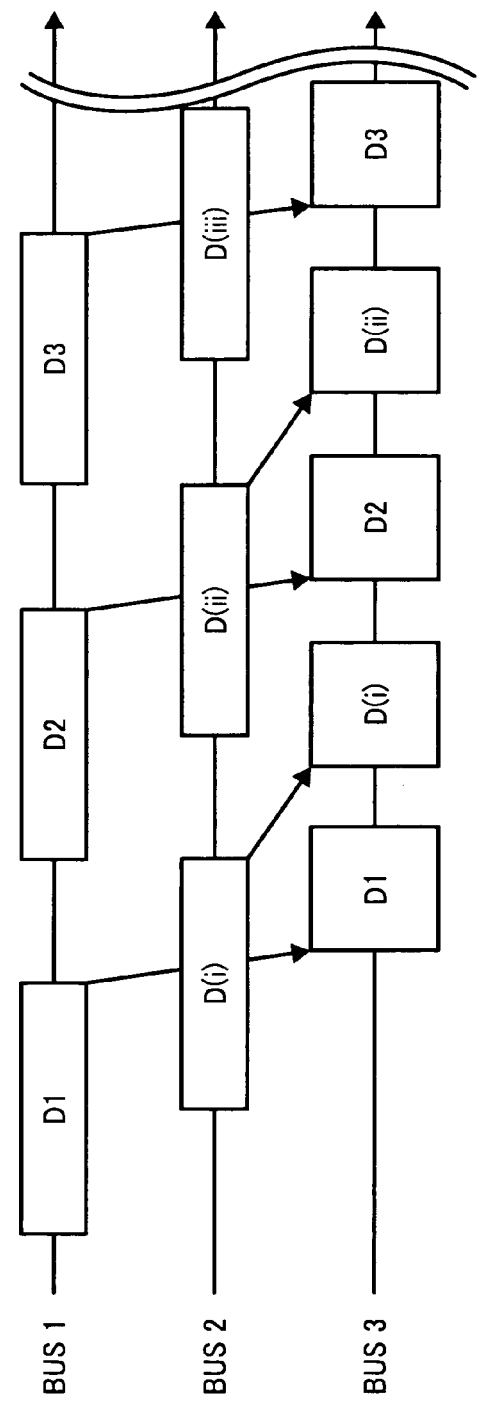
FIG. 7 is a timing chart illustrating data transfer on buses according to the first illustrative embodiment.

FIG. 6 is a timing chart illustrating data transfer performed in the image processing device according to the first illustrative embodiment. FIG. 7 is a timing chart illustrating data transfer on the buses 1 to 3 according to the first illustrative embodiment.

The image data respectively read by the CCD 110 and the CIS 100 are processed by the image processing units 112 and 102 respectively provided on the image paths 1 and 2 as illustrated in FIG. 6. Accordingly, the image data thus processed are output to the bus switch 300 at a corresponding time without outputting each image data in the order the image data are read.

The bus switch 300 receives the image data from each of the buses 1 and 2, and adjusts the bus 3 to transfer the image data to the memory control unit 201. It is to be noted that the bus switch 300 is configured such that a number of connection lanes connected to the memory control unit 201 is equal to or greater than a total number of connection lanes connected to each of the image processing units 102 and 112.

With such a configuration, each of the image data of the front and back sides of the document page is not required to be transferred one after the other, and the image data of the back side of the document page is not required to be transferred during the page interval. As a result, the page interval can be reduced, and an operation to switch parameters in the filter processing unit 400, the color correction unit 404, and so forth can be omitted, reducing processing load on software.

Specifically, the image data of the front and back sides of the document page can be simultaneously output to the bus switch 300 from each of the image processing units 102 and 112, so that a processing speed of each of the image processing units 102 and 112 is not required to be higher than a data reading speed.

Referring to FIG. 7, data D1 processed on the bus 1 is output to the bus 3 immediately after completion of image processing. Further, data D(i) processed on the bus 2 can be output to the bus 3 immediately after completion of image processing.

In addition, as described above, each of the image data of the front and back sides of the document page is not required to be transferred one after the other, and the image data of the back side of the page is not required to be transferred during the page interval. As a result, the page interval can be reduced, and operations to switch the parameters in the filter processing unit 400, the color correction unit 404, and so forth can be omitted, reducing processing load on software.

According to the first illustrative embodiment, two sets of four connection lanes respectively connected to the image processing units 102 and 112, and eight connection lanes connected to the memory control unit 201, are provided in the bus switch 300. In order to achieve faster processing speed, a number of the connection lanes connected to the memory control unit 201 may simply be increased to, for example, 16 lanes, 32 lanes, and so forth. In other words, it is not necessary to increase the processing speed of the image processing units 102 and 112.

Figure 8:
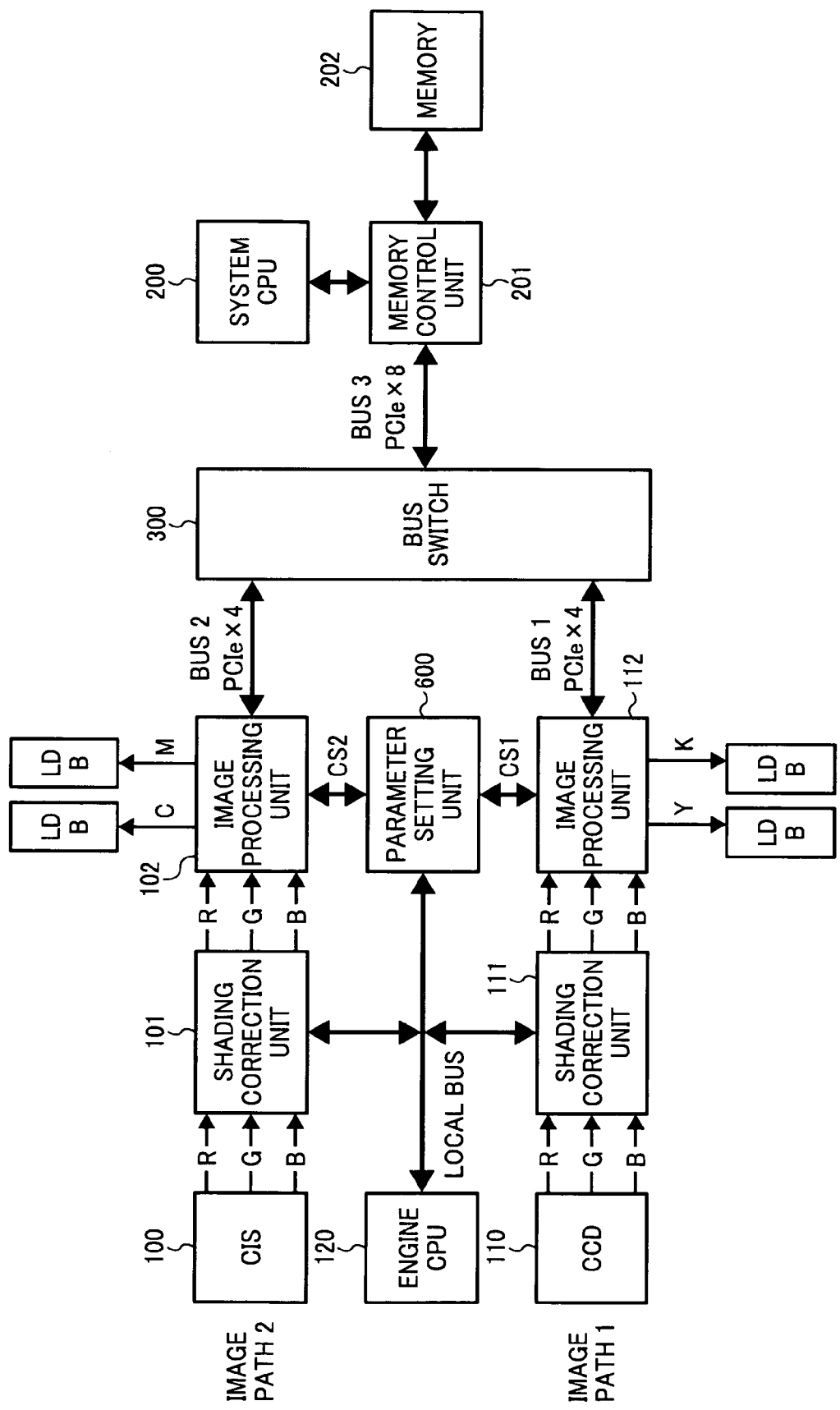
FIG. 8 is a block diagram illustrating a configuration of an image processing device according a second illustrative embodiment.

FIG. 8 is a block diagram illustrating a configuration of the image processing device according to a second illustrative embodiment. In the second illustrative embodiment, the image processing unit 112 on the image path 1 and the image processing unit 102 on the image path 2 have the same configuration, and a parameter setting unit 600 to simultaneously set the same parameter to both the image processing units 112 and 102 is provided.

Figure 9:
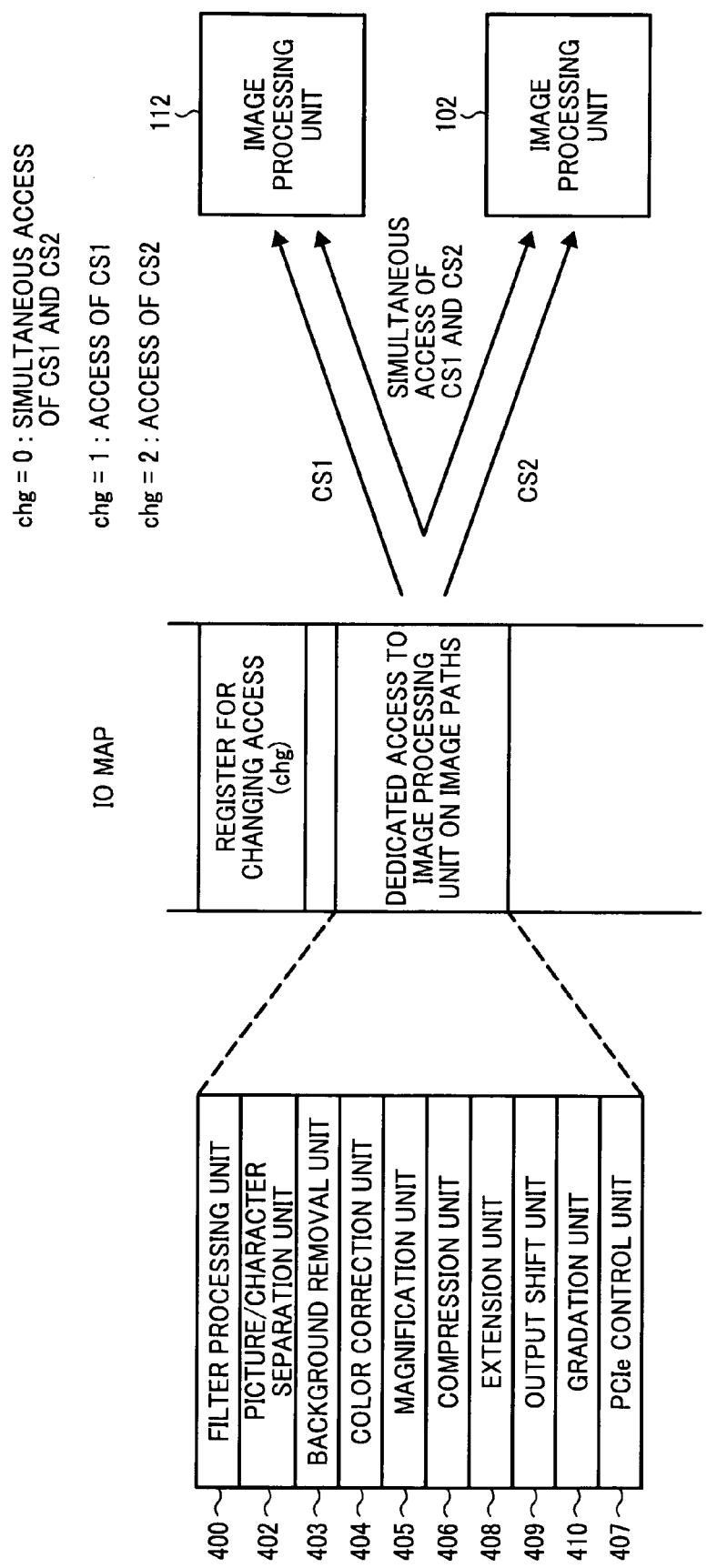
FIG. 9 is a view illustrating an example of an IO map of the image processing device according to the second illustrative embodiment.

FIG. 9 is a view illustrating an example of an IO map of the, image processing device according to the second illustrative embodiment. Access of CS1 to the image processing unit 112, access of CS2 to the image processing unit 102, or simultaneous access of CS1 and CS2 can be set by a register for changing access (chg).

Because the image processing units 102 and 112 have the same configuration, the same offset address for the parameter is used. Accordingly, when simultaneous access of CS1 and CS2 is set, conversion parameters, such as a scale setting, effective image size, and color correction, can be written from the engine CPU 120 at the same time. As a result, a number of times to set the parameters can be reduced, reducing processing load on software.

Figure 10:
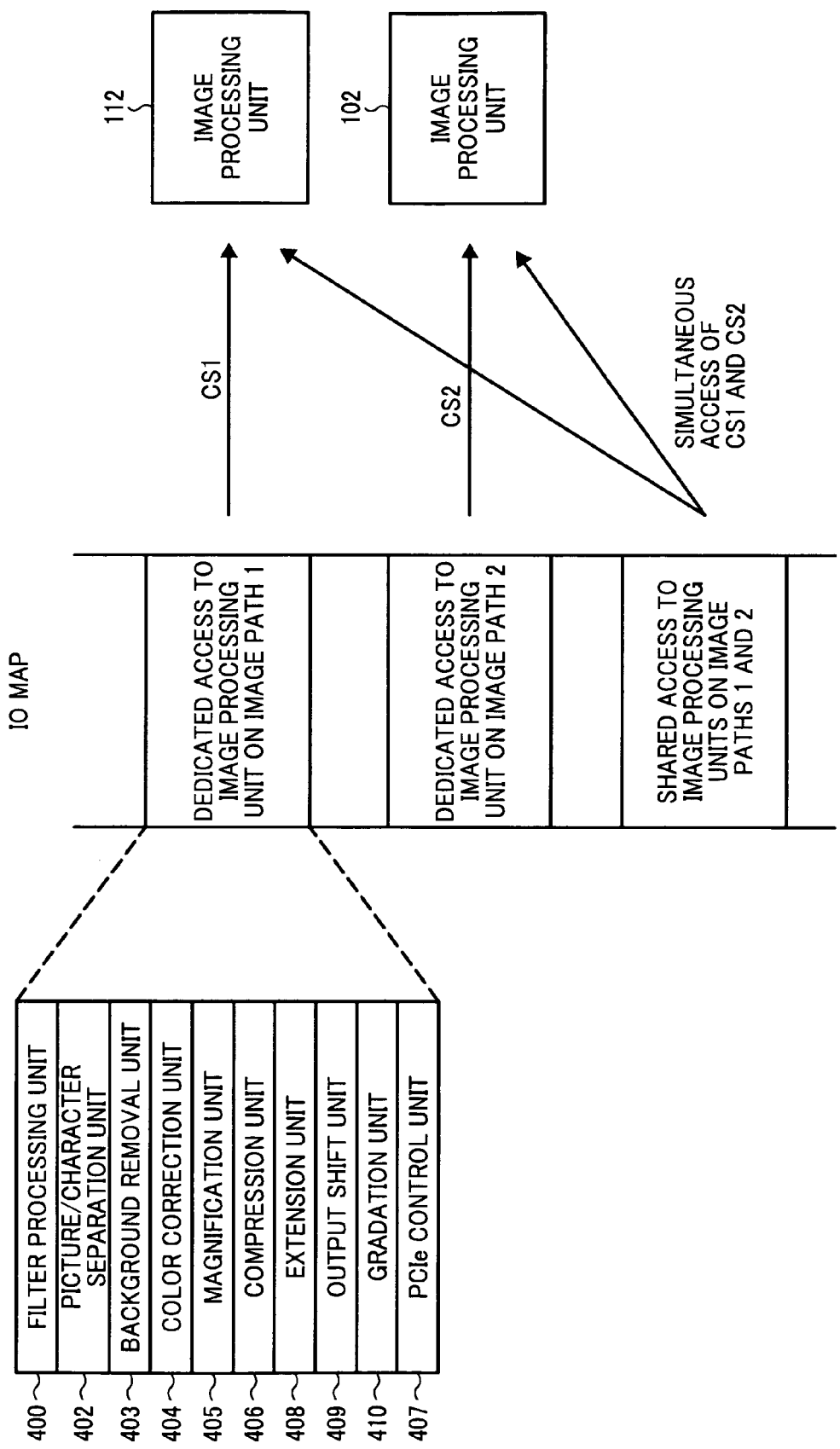
FIG. 10 is a view illustrating another example of the IO map of the image processing device according to the second illustrative embodiment.

FIG. 10 is a view illustrating another example of the IO map of the image processing device according to the second illustrative embodiment. Referring to FIG. 10, access space dedicated to each of the image processing units 102 and 112 and shared access space are provided.

As described above, because the dedicated access spaces and the shared access space are separately provided, switching over the dedicated access spaces and the shared access space is not necessary. Further, the dedicated access spaces and the shared access space are more easily distinguishable, eliminating wrong settings.

A description is now given of a method for effectively transferring image data to the memory 202 from the multiple image processing units 112 and 102 through the bus switch 300 by using a data compression unit provided in the bus switch 300, without increasing a bus bandwidth on the memory 202 side in the bus switch 300.

Figure 11:
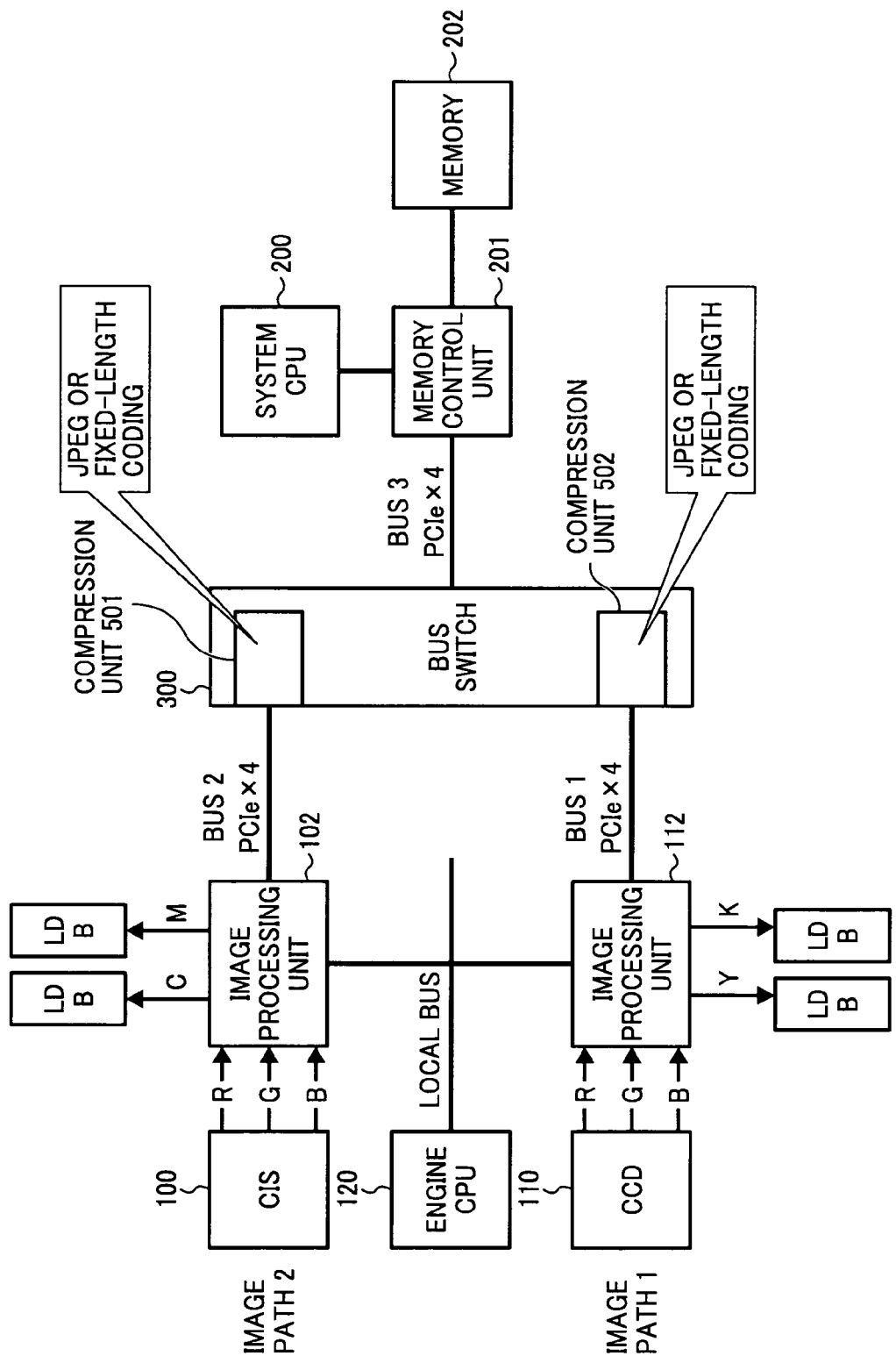
FIG. 11 is a block diagram illustrating a configuration of an image processing device according to a third illustrative embodiment.

In the image processing device according to a third illustrative embodiment shown in FIG. 11, the bus switch 300 includes a data compression unit for each image path. The data compression unit selects either a widely used compression method such as a JPEG compression method or a locally used fixed-length coding method depending on whether or not read image data is to be reused, and compresses the image data using the compression method thus selected. Because the bus switch 300 includes the multiple compression methods selectable depending on the purpose, even higher reading speed and higher-quality image data can be reliably handled with a narrow bus bandwidth.

Further, because the data compression unit is provided for each of the image processing units 112 and 102, image data sent from the multiple image processing units 112 and 102 can be stored in the memory 202 without increasing the bus bandwidth on the memory 202 side in the bus switch 300 that connects the bus switch 300 and the memory control unit 201. As a result, the bus bandwidth and a usage area in the memory 202 can be reduced.

When the read image data is to be reused, the image data is read with an enlarged scale in a sub-scanning direction. The read image data is then scaled down to be transferred to the bus switch 300. Accordingly, the bus bandwidth is effectively used by adjusting a transfer rate of the image data to the maximum transfer rate for the JPEG compression method.

Figure 12:
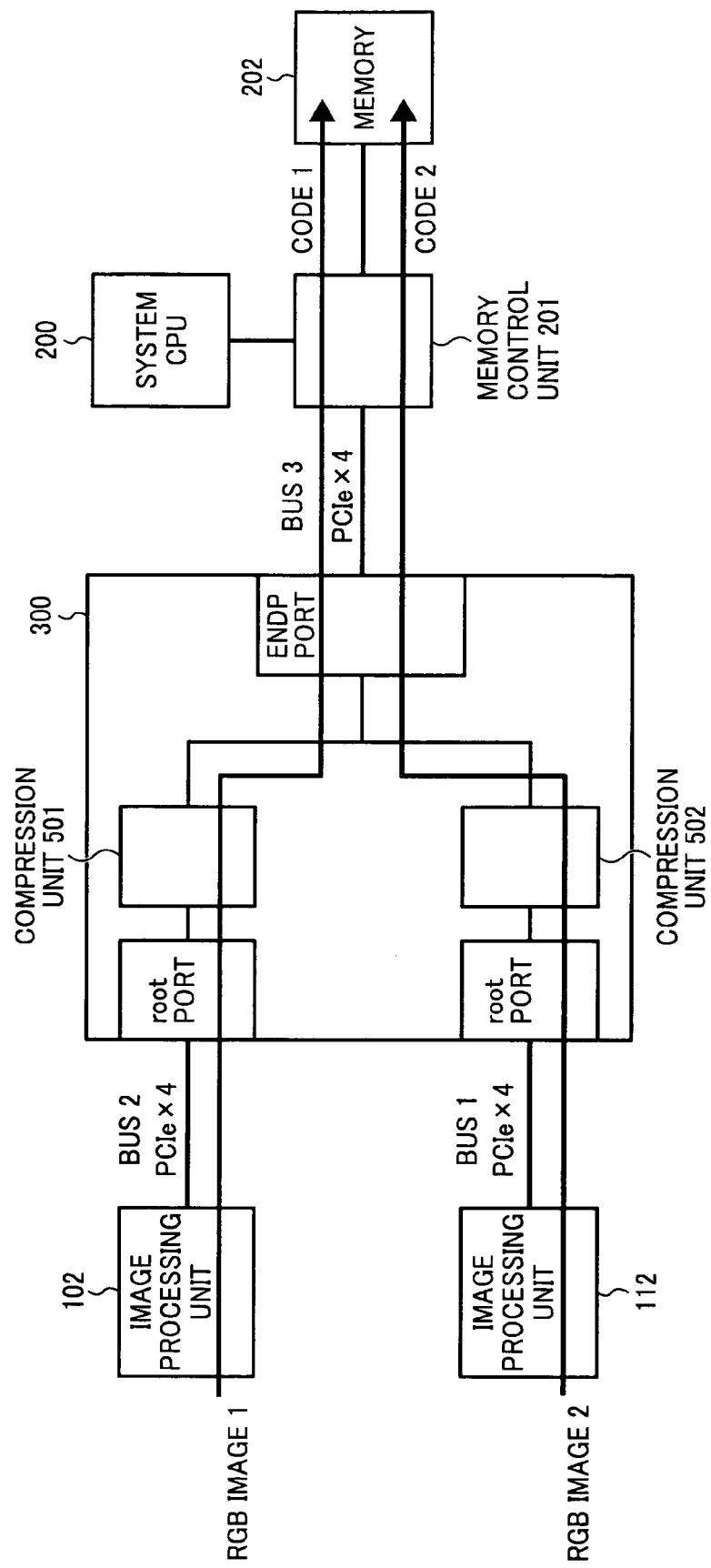
FIG. 12 is a diagram illustrating data transfer performed in the image processing device according to the third illustrative embodiment.

FIG. 11 is a block diagram illustrating a configuration of the image processing device according to the third illustrative embodiment. FIG. 12 is a diagram illustrating data transfer performed in the image processing device according to the third illustrative embodiment.

Referring to FIG. 11, the bus switch 300 includes compression units 501 and 502 for respective image paths 1 and 2. Each of the compression units 501 and 502 encodes input image data using a preset compression method.

The image data read by the CIS 100 is processed by the image processing unit 102, and then compressed with the JPEG compression method or the fixed-length coding method by the compression unit 501 provided in the bus switch 300. The image data thus compressed is stored in the memory 202 through the memory control unit 201. Similarly, the image data read by the CCD 110 is processed by the image processing unit 112, and then compressed by the compression unit 502. The image data thus compressed is stored in the memory 202 through the memory control unit 201.

The encoded data generated by the compression units 502 and 501 on the buses 1 and 2 respectively are adjusted in the bus switch 300, and then output to the bus 3. The memory control unit 201 receives the encoded data of the front and back sides of the document page, and sends the data to the memory 202 so that the memory 202 stores the data into a memory area corresponding to the respective sides of the document page.

The image data processed by the image processing unit 102 or 112 is compressed by the compression unit 501 or 502, so that an amount of data to be transferred to the memory 202 is reduced. As a result, a transfer rate can be reduced, reducing the bus bandwidth and the usage area in the memory 202.

A description is now given of the compression method selected by the compression units 501 and 502. In recent years, read image data is often reused. As a result, high-quality image data with higher usability stored with high fidelity to an original document is required for reuse of the read-image data.

For example, in a case in which an RBG image with a resolution of 600 dpi read at a magnification of 100% is stored as is, an amount of data stored is about 210 MB when a size of the image data is A3. An amount of the data stored is increased to 420 MB when the image data of both sides of the document page having a size of A3 is stored. To reduce an amount of data, the compression units 501 and 502 use the widely used JPEG compression method to enhance usability of the stored data.

By using the JPEG compression method, it is assumed that image data of a general document is compressed to one-eighth to one-tenth of its original data size. Accordingly, an encoded data amount of the single side of the document page can be reduced to one-tenth of 210 MB, that is, 21 MB, and similarly, that of both sides of the document page can be reduced to 42 MB. As a result, the bus bandwidth and the usage area in the memory 202 can be reduced.

However, due to variation in encoded data amount generated using the JPEG compression method, there is a possibility that the compression rate may be 1. Consequently, the transfer rate of the data may not be increased. Further, because a longer time is required to generate the encoded data, transfer speed of the data may be decreased.

To solve such problems, a magnification in the sub-scanning direction in the CIS 100 and the CCD 110, respectively, is set to m %, and a reduction rate in the sub-scanning direction in the magnification unit 405 of each of the image processing units 102 and 112, respectively is set to 1/m %, to read the image data of the document page. Accordingly, the transfer rate of the data on the buses 1 and 2 can be adjusted to the processing speed for the JPEG compression method. In such a case, although the amount of data transferred to the bus switch 300 is not changed, a cycle for one line is increased so that the transfer rate of the data can be reduced. Accordingly, as described above, the transfer rate of the data on the buses 1 and 2 can be adjusted to the processing speed of the JPEG compression method.

Figure 13:
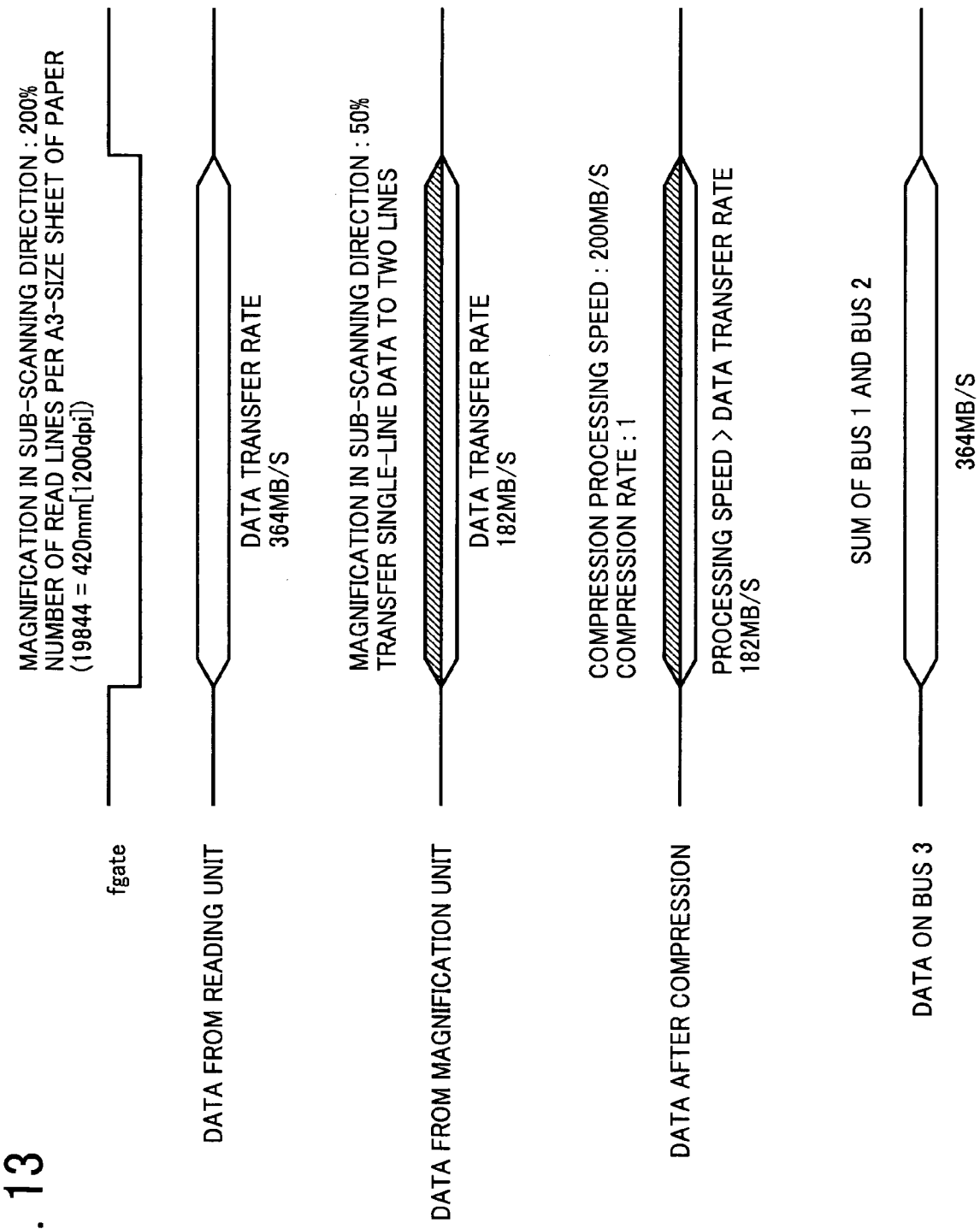
FIG. 13 is a timing chart illustrating an example of reduction in a transfer rate of data according to illustrative embodiments.

FIG. 13 is a timing chart illustrating an example of reduction in the transfer rate of the data. It is to be noted that the transfer rate from the CIS 100 and the CCD 110 is set to 364 MB/s ((8,000 dpi in the main scanning direction/line cycle of 66 μs)×3), the processing speed of the JPEG compression method is set to 200 MB/s, the magnification in the CIS 100 and the CCD 110 is set to 200%, and the reduction rate in the magnification unit 405 is set to 50%.

When a document page having a size of A3 is read at 600 dpi, the CIS 100 and the CCD 110 read the document page with the magnification of 200% as described above. Specifically, 19,844 lines (9,922 lines×2), corresponding to 1,200 dpi, are read by the CIS 100 and the CCD 110. Accordingly, the data corresponding to 1,200 dpi is input to the magnification unit 405, and then is reduced by 50% by the magnification unit 405. As a result, data in which data for a single line is included in two lines is output to the bus switch 300.

Accordingly, an amount of data is 600 dpi, and data for one line is transferred to two lines. As a result, the transfer rate after the magnification unit 405 is reduced to 182 MB/s, that is, a half of 364 MB/s. Because the transfer rate of 182 MB/s is slower than the processing speed of the JPEG compression method, data transfer is not prevented even when the compression rate is 1. Further, because the transfer rate is reduced by half, it is not necessary to increase the bus bandwidth even in a case in which the image data are simultaneously transferred from the multiple image processing units 102 and 112.

Accordingly, even when the read image is to be reused and the JPEG compression method is set, the transfer rate of the data is adjusted to the processing speed of the compression units 501 and 502, so that the data is reliably transferred with a narrow bus bandwidth.

When the read image is not to be reused, the fixed-length coding method is used at compression. Accordingly, although the data lacks compatibility, an amount of code generated is constant, and the transfer rate of the data is not changed. As a result, the image data of both sides of the document page can be read at higher speed.

Figure 14:
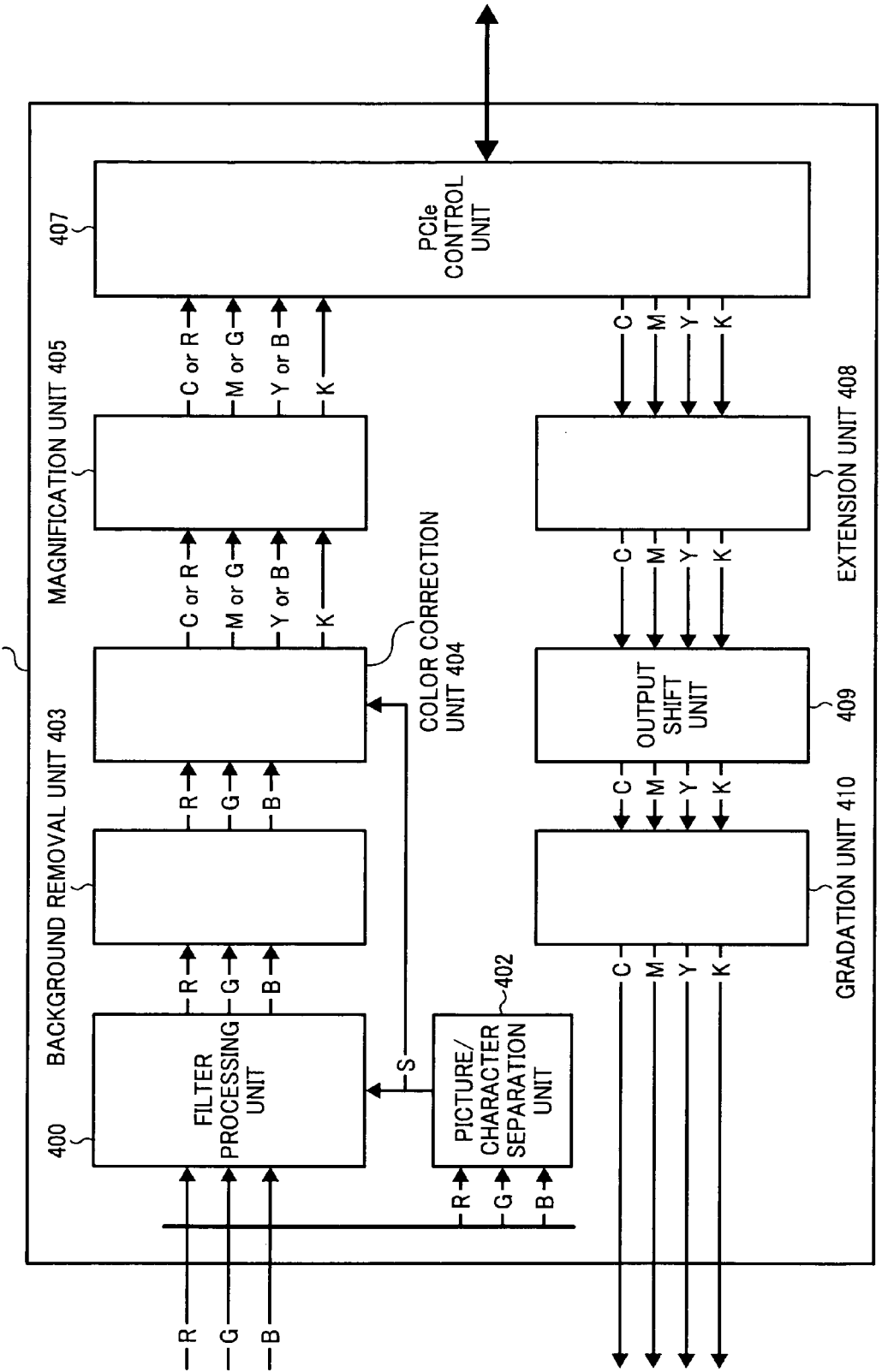
FIG. 14 is a block diagram illustrating a configuration of the image processing unit in which a fixed length coding method is performed.

FIG. 14 is a block diagram illustrating the image processing unit 102 or 112 in which the fixed length coding method is performed. As illustrated in FIG. 14, when the fixed-length coding method is used, an RGB image is converted into a CMYK image by the color correction unit 404. Thereafter, image data of the CMYK image is compressed to one-quarter the original size. In the above-described example, the CMYK image with 280 MB created from the RGB image with 210 MB is stored in the memory 202 as encoded data with 70 MB using the fixed-length coding method. When the image data of both sides of the document page are compressed, encoded data with 140 MB is stored in the memory 202. The compression method is switched to the JPEG compression method when the read image data is reused, while the compression method is switched to the fixed-length coding method when the read image data is not reused, so that the data is reliably transferred with a narrow bus bandwidth.

It is to be noted that illustrative embodiments of the present invention are not limited to those described above, and various modifications and improvements are possible without departing from the scope of the present invention. It is therefore to be understood that, within the scope of the associated claims, illustrative embodiments may be practiced otherwise than as specifically described herein. For example, elements and/or features of different illustrative embodiments may be combined with each other and/or substituted for each other within the scope of the illustrative embodiments.

What is claimed is:

1. An image forming apparatus comprising an image processing device, the image processing device comprising:
   a first image reading unit configured to read image data on a front side of a document page;
   a second image reading unit configured to read image data on a back side of the document page;
   a first image processing unit configured to process the image data read by the first image reading unit;
   a second image processing unit configured to process the image data read by the second image reading unit;
   a memory configured to store the image data processed by the first image processing unit and the second image processing unit; a memory control unit to control access to the memory; and
   a bus switch configured to connect the first image processing unit and the second image processing unit to the memory,
   the bus switch comprising a first compression unit configured to compress the image data processed by the first image processing unit and a second compression unit configured to compress the image data processed by the second image processing unit,
   the bus switch configured to output to the memory encoded data generated by compressing the image data using the first compression unit and the second compression unit,
   wherein the first compression unit and the second compression unit are configured to change a compression method used therein depending on whether or not the read image data is reused,
   wherein, in a case in which the read image data is reused, the image data is enlarged in a sub-scanning direction when read and then reduced for transfer to the bus switch.

2. An image processing device, comprising:
   a first image reading unit configured to read image data on a front side of a document page;
   a second image reading unit configured to read image data on a back side of the document page;
   a first image processing unit configured to process the image data read by the first image reading unit;
   a second image processing unit configured to process the image data read by the second image reading unit;
   a memory configured to store the image data processed by the first image processing unit and the second image processing unit;
   a memory control unit configured to control access to the memory; and
   a bus switch configured to connect the first image processing unit and the second image processing unit to the memory control unit,
   the bus switch comprising a first compression unit configured to compress the image data processed by the first image processing unit and a second compression unit configured to compress the image data processed by the second image processing unit,
   the bus switch configured to output to the memory control unit encoded data generated by compressing the image data using the first compression unit and the second compression unit,
   wherein the first compression unit and the second compression unit are configured to change a compression method used therein depending on whether or not the read image data is reused, and
   wherein, in a case in which the read image data is reused, the image data is enlarged in a sub-scanning direction when read and then reduced for transfer to the bus switch.

3. The image processing device according to claim 2, wherein the compression method includes a JPEG compression method and a fixed-length coding method.

4. The image processing device according to claim 2, further comprising:
   a first address space configured to access the first image processing unit;
   a second address space separate from the first address space configured to access the second image processing unit; and
   a shared address space separate from the first address space and the second address space for accessing the first image processing unit and the second image processing unit simultaneously.

5. The image processing device according to claim 2, further comprising a parameter setting unit configured to set a parameter to the first image processing unit and the second image processing unit,
   wherein the first image processing unit and the second image processing unit have an identical configuration and the parameter setting unit is configured to simultaneously set the same parameter to the first image processing unit and the second image processing unit.

6. An image processing method employed in an image processing device comprising a first image processing unit and a second image processing unit, a memory, a memory control unit configured to control access to the memory, and a bus switch configured to connect the first image processing unit and the second image processing unit to the memory control unit, the image processing method comprising the steps of:
first reading image data on a front side of a document page;
second reading image data on a back side of the document page;
first processing the image data read by the first reading;
second processing the image data read by the second reading;
storing the image data processed in the first processing and the second processing;
first compressing the image data processed by the first processing;
second compressing the image data processed by the second processing; and
outputting encoded data generated by the first compressing and the second compressing to the memory,
wherein the first compressing, the second compressing, and the outputting are performed in the bus switch,
wherein a compression method used in the first compressing and the second compressing is changed depending on whether or not the read image data is reused, and
wherein, in a case in which the read image data is reused, the image data is enlarged in a sub-scanning direction when read and then reduced for transfer to the bus switch.

7. The image processing method according to claim 6, further comprising setting a parameter after the first image processing and the second image processing,
wherein the first processing and the second processing are performed by two different devices having an identical configuration and the setting simultaneously sets the same parameter to the first image processing unit and the second image processing unit.

8. The image processing method according to claim 6, further comprising:
first accessing the first image processing unit in the first processing;
second accessing the second image processing unit in the second processing; and
simultaneously accessing the first image processing unit and the second image processing unit in the first processing and the second processing.

9. The image processing method according to claim 6, wherein the compression method includes a JPEG compression method and a fixed-length coding method.

* * * * *